United States Patent
Zheng

(10) Patent No.: US 10,083,318 B2
(45) Date of Patent: Sep. 25, 2018

(54) PATTERN MATCHING FOR DATA LEAK PREVENTION

(71) Applicant: Fortinet, Inc., Sunnyvale, CA (US)

(72) Inventor: Juneng Zheng, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 109 days.

(21) Appl. No.: 14/981,528

(22) Filed: Dec. 28, 2015

(65) Prior Publication Data

US 2017/0185799 A1    Jun. 29, 2017

(51) Int. Cl.
*G06F 7/04* (2006.01)
*G06F 21/62* (2013.01)
*G06F 17/30* (2006.01)

(52) U.S. Cl.
CPC .... *G06F 21/6245* (2013.01); *G06F 17/30528* (2013.01); *G06F 17/30867* (2013.01)

(58) Field of Classification Search
CPC .............. H04L 9/0841; H04L 9/3218; H04L 29/12207; H04L 51/00; H04L 61/20; H04L 67/02; H04L 67/1002; H04L 67/1008; H04L 67/1017; H04L 67/1029; H04L 67/1095; H04L 67/1097; H04L 67/28; H04L 67/2814; H04L 67/2823; G06F 17/30528; G06F 21/6245; G06F 17/30867; G06F 17/2705; G06F 17/271; G06F 17/2775; G06F 17/30985; G06F 21/552; G06N 7/005; G11B 2020/1457; G11B 20/1426; H03M 5/145

See application file for complete search history.

(56) References Cited

U.S. PATENT DOCUMENTS

| | | | | |
|---|---|---|---|---|
| 8,738,860 | B1* | 5/2014 | Griffin ............... | G06F 12/0897 711/122 |
| 8,818,923 | B1* | 8/2014 | Hoffmann ......... | G06F 17/30985 706/18 |
| 8,862,603 | B1* | 10/2014 | Watson ............. | G06F 17/30985 707/712 |
| 2012/0011084 | A1* | 1/2012 | Gulwani ............. | G06F 17/2282 706/12 |
| 2013/0304690 | A1* | 11/2013 | Perlmutter .............. | G06N 5/02 706/48 |
| 2014/0380471 | A1* | 12/2014 | Levow ............... | H04L 63/1408 726/23 |

* cited by examiner

*Primary Examiner* — Abiy Getachew
(74) *Attorney, Agent, or Firm* — Hamilton, DeSanctis & Cha LLP

(57) ABSTRACT

Systems and methods for preprocessing data to facilitate DLP pattern matching are provided. An input string is received by a Data Leak Prevention (DLP) system. The input string is converted by the DLP system into a fixed string pattern. The conversion is performed based on multiple class definitions, including a digit class, a letter class and a symbol class. A determination is then made by the DLP system regarding whether the input string contains potential sensitive data to which a full-match is to be applied by matching the fixed string pattern against one or more stored target strings representative of sensitive data.

14 Claims, 8 Drawing Sheets

PATTERN MATCHING FOR DATA LEAK PREVENTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to network and data security technology. In particular, embodiments of the present invention relate to high performance pattern matching for data leakage detection and prevention and preprocessing of data to facilitate data leak prevention (DLP) pattern matching.

Description of the Related Art

One of the primary concerns of every user and organization connected over the Internet in this age of Information Technology (IT) is data security and prevention of data leakage. Data privacy and data leak prevention (DLP) are therefore among the key concerns for any organization as computing devices within a network may contain sensitive data/information that, if not protected effectively, can be transferred to anyone and anywhere across the globe in very little time. Such sensitive data can include information relating to customers, bank account details, credit card details, social security numbers, dates of birth and the like. For an organization, such data can include sales contracts, customer lists, supplier lists, future product details, financial information, deliveries, supplies, medical records, employee details, manufacturing details, Intellectual Properties, Trade Secrets and the like.

Existing systems and methods for DLP generally use pattern matching for identifying sensitive data, and then attempt to prevent its leakage. As there may be thousands of such patterns for different data sets/types, pattern matching and identification of sensitive data can be time consuming, and hence can make transactions slow. Generally, input strings and data patterns to be matched are represented as regular expressions, the processing of which is computationally expensive and can lead to slow performance. Pattern matching for identification of sensitive data becomes more difficult for data types such as Social Security Numbers, Credit Card Numbers, Dates of Birth, telephone numbers, vehicle registration numbers, among others, which may have standard patterns but also have complex requirements for different positions within data streams/strings, for example, and hence require the creation and use of several regular expressions. For example, as of 2011, non-customized California vehicle registration plates use a seven character alphanumeric serial format having an integer value of 0-9 followed by three capital letters and ending with three integer values of 0-9. While a simple regular expression can be defined to identify such a pattern, other states have different serial formats and the serial formats have changed over the years. As such, those skilled in the art will appreciate a large number of regular expressions would be required to identify all possible serial formats used by every state over the years. Meanwhile, due to the complexity, such data types cannot be processed in parallel like other regular pattern matching implementations.

There is therefore a need for improved, high performance pattern matching that is capable of efficiently detecting sensitive data while in use (e.g., endpoint actions), in motion (e.g., network traffic) and/or at-rest (e.g., data storage) to prevent data leakage.

SUMMARY

Systems and methods are described for data leak detection and prevention. An input string is received by a Data Leak Prevention (DLP) system. The input string is converted by the DLP system into a fixed string pattern. The conversion is performed based on multiple class definitions, including a digit class, a letter class and a symbol class. A determination is then made by the DLP system regarding whether the input string contains potential sensitive data to which a full-match is to be applied by matching the fixed string pattern against one or more stored target strings representative of sensitive data.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
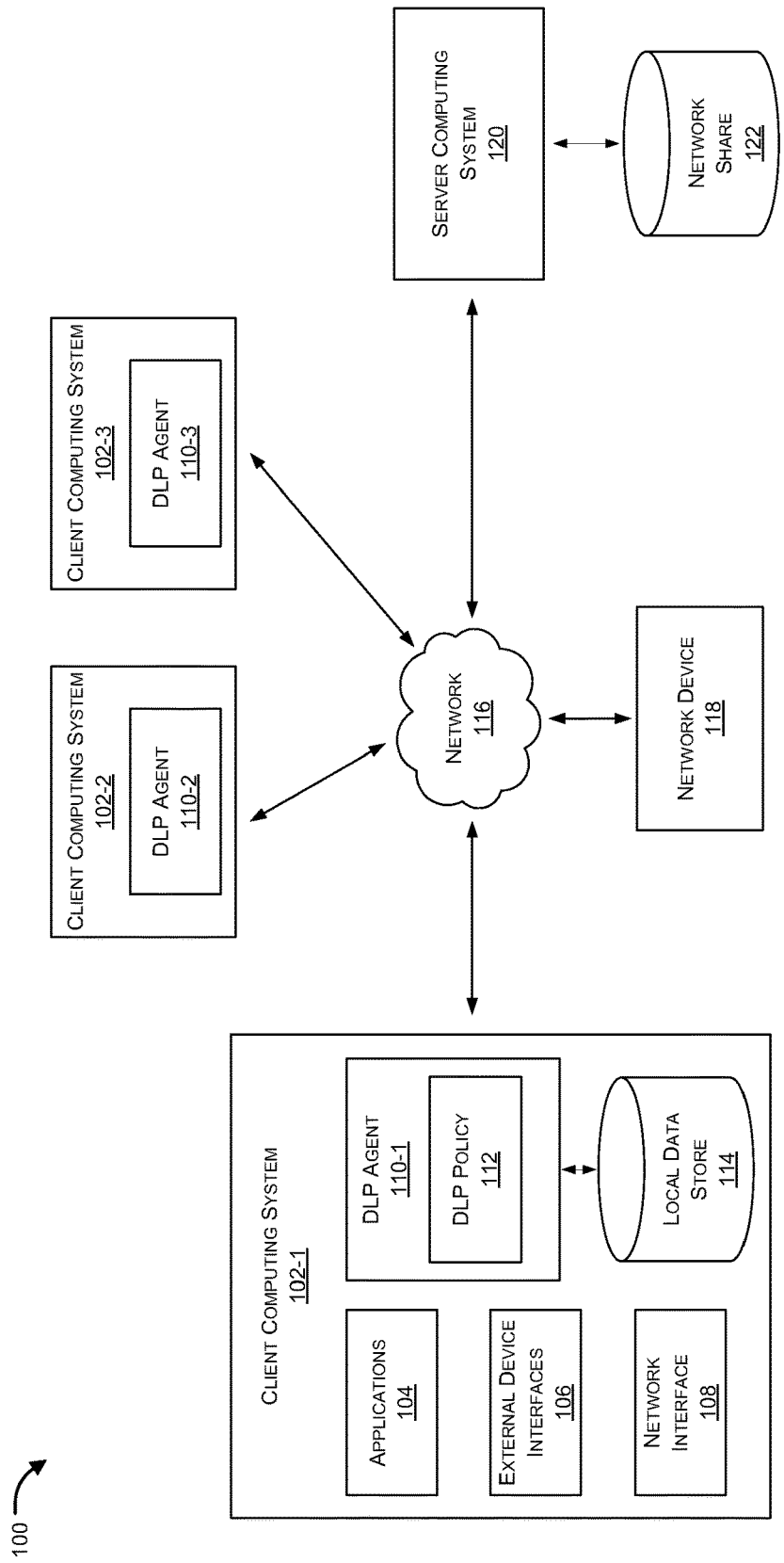
FIG. 1A illustrates an exemplary network architecture showing configuration of a DLP agent in accordance with an embodiment of the present invention.

Systems and methods are described for data leak detection and prevention. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named embodiment/implementation.

Embodiments of the present invention generally relate to data leakage detection and prevention. In particular, embodiments of the present invention relate to high performance pattern matching for data leakage detection and prevention. Systems and methods are also described for preprocessing data to facilitate DLP pattern matching.

In accordance with one embodiment, a DLP system includes one or more processors and a memory. The memory contains therein an input string receive module that is configured to receive an input string and a fixed string pattern based conversion module that is configured to convert the input string into a fixed string pattern. The conversion is performed based on multiple class definitions, including a digit class, a letter class and a symbol class. The DLP system can further include a pre-match implementation module that is configured to enable simultaneous matching between the fixed string pattern and one or more stored target strings that are representative of sensitive data in order to determine whether the input string contains potential sensitive data to which a full-match is to be applied. The existence of potentially sensitive data can then be determined when the fixed string pattern matches one of the stored target strings.

In an aspect, the fixed string pattern can be formed by, for each character position within the input string, identifying a matching class of the multiple of classes for a character at the character position within the input string, and then replacing the character at the character position within the input string with a single character associated with the matching class followed by an integer value indicative of consecutive matches to the matching class.

In another aspect, the fixed string pattern can be formed by, for each character position within the input string, identifying a matching class of the multiple of classes for a character at the character position within the input string, replacing the character at the character position within the input string with a current replacement character of a plurality of characters associated with the matching class, and setting the current replacement character to a next character of the plurality of characters.

In an aspect, the letter class can include an upper case letter subclass and a lower case letter subclass. In another aspect, the symbol class can include a supported symbol subclass and an unsupported symbol subclass. In another aspect, multiple fixed string patterns of multiple corresponding input strings can be processed in parallel against the one or more stored target strings. In an aspect, the fixed string pattern based conversion module can further be configured to detect any of integer overflows or long word overflows while converting the input string to the fixed string pattern.

In yet another aspect, the matching can be conducted based on any or a combination of deterministic finite automaton algorithms, including, but not limited to, Morris-Pratt algorithm, Brute Force algorithm, Karp-Rabin algorithm, Shift Or algorithm, Knuth-Morris-Pratt algorithm, Simon algorithm, Colussi algorithm, Galil-Giancarlo algorithm, Apostolico-Crochemore algorithm, Not So Naive algorithm, Boyer-Moore algorithm, Turbo BM algorithm, Apostolico-Giancarlo algorithm, Reverse Colussi algorithm, Horspool algorithm, Quick Search algorithm, Tuned Boyer-Moore algorithm, Zhu-Takaoka algorithm, Berry-Ravindran algorithm, Smith algorithm, Raita algorithm, Reverse Factor algorithm, Turbo Reverse Factor algorithm, Forward Dawg Matching algorithm, Backward Nondeterministic Dawg Matching algorithm, Backward Oracle Matching algorithm, Galil-Seiferas algorithm, Two Way algorithm, String Matching on Ordered Alphabets algorithm, Optimal Mismatch algorithm, Maximal Shift algorithm, Skip Search algorithm, KMP Skip Search algorithm, and Alpha Skip Search algorithm.

FIG. 1A illustrates an exemplary network architecture 100 showing configuration of a DLP agent (e.g., DLP agent 110-1, 110-2 or 110-3) in accordance with an embodiment of the present invention. According to one embodiment, a DLP system may be implemented as a standalone system communicably coupled with or integrated within one or more other network devices to monitor and prevent data leakage from the monitored network device(s). In alternative embodiments, a DLP system may be implemented within a typical client computing device or within a network device, including, but not limited to a firewall, a gateway, a router, or any other network device or network security device. As shown in FIG. 1A, DLP agents 110-1, 110-2 and 110-3 may be implemented within client computing system 102-1, client computing system 102-2, and client computing system 102-3, respectively, which may also be referred to collectively and interchangeably as client device(s) 102 hereinafter. In the context of the present example, in addition to regular applications 104, client computing system 102-1 can include DLP agent 110-1 having a corresponding DLP policy 112. In addition, client computing system 102-1 can include one or more external device interface(s) 106 and network interface(s) 108. In an exemplary implementation, each client device 102-1, 102-2 and 102-3 within a network 116 (e.g., an enterprise network) can include a local DLP agent (e.g., DLP agent 110-1, 110-2 and 110-3, respectively, which may be collectively and interchangeably referred to as DLP agent(s) 110 hereinafter.

In some embodiments, DLP agents 110 may also or alternatively be incorporated within network devices, such as network device 118. In an embodiment, exemplary network architecture 100 can include a server computing system 120, which can be configured to retrieve data from a network shared storage drive 122. In an aspect, communication from server 120 can be monitored continuously or at periodic intervals in order to detect and prevent data leakage from server 120, wherein detection and prevention of data leakage from server computing system 120 can be important as a result of server 120 generally having access to a large amount of sensitive data stored in network shared storage drive 122, for example.

Depending upon the particular implementation, data leakage can be detected and/or prevented at different levels of network architecture 100. For instance, data leakage from server computing device 120, individual client devices 102 and/or at a particular network device (e.g., network device 118) can be detected and/or prevented using a DLP system, such as that described herein, which facilitates efficient DLP pattern matching.

In an exemplary implementation, a typical client device (e.g., client device 102-1) may have different applications 104 (e.g., a web browser, Java script based applications, Email client applications, interactive messaging clients, File Transfer Protocol (FTP) clients, among others) that can be used by a user of the client device to intentionally or unintentionally send sensitive data from the client device to an unauthorized user and/or device within network 116 or outside of network 116. DLP agent 110-1 implemented within client device 102-1 can be configured to monitor and prevent leakage of known types of sensitive data from client device 102-1. In an exemplary implementation, DLP agent 110-1 can be configured to monitor and prevent transfer of sensitive data via network interface 108. In another exemplary implementation, DLP agent 110-1 can be configured to monitor and prevent transfer of sensitive data through external device interface 106 (e.g., a Universal Serial Bus (USB) interface, microSD interface, CD drive or the like).

In different implementations, data stored on local data storage 114 can be marked as sensitive in a manner such that when such sensitive data is retrieved from storage 114, DLP agent 110-1 can start monitoring the flow of data between different applications, and prevent leakage of the data before it crosses a predefined boundary. In an exemplary implementation, the flow of sensitive data can be restricted with a user-defined or system-defined dynamically generated boundary. For instance, for particular data, the boundary for unfettered access can be access of secured data by an authorized user only through a particular application such that if the same data is accessed by another application, DLP agent 110-1 can block such access of the secured data.

In an exemplary implementation, DLP agent 110-1 can be configured to monitor and prevent even printouts of sensitive data. The DLP agent 110-1 can initiate data monitoring and prevention responsive to observing a command/instruction issued by client computing system 102-1 to local data store 114, for example. In an exemplary implementation, DLP agents 110 can be integrated with particular applications 104 running on client device 102 such that communication/data transfer from client device 102 using applications 104 can be monitored to detect and prevent data leakage.

In an aspect of the present invention, DLP agents 110 can be configured to receive data strings from different sources to determine the presence of sensitive and/or protected data in such received input/data strings, and prevent transfer of protected data/strings if sensitive data is detected therein. In an exemplary implementation, an input string can be received at run-time from a pool of data at network interface 108, or can be received from application 104 or from any other external interface 106/source. In an exemplary implementation, the received data string (e.g., from a file (e.g., a Microsoft Word file, a Microsoft Excel file, a PDF file, a text file, etc.), from the contents of an email message, from the contents of a Hypertext Transfer Protocol (HTTP) request or response, from the contents of the address or search bar of a web browser or the like) can be converted into a fixed string pattern based on an appropriate class definition selected from multiple class definitions as a preprocessing step before performing comparisons to potential sensitive fixed data DLP patterns. In an aspect, class definitions can include but are not limited to a digit class, a letter class and a symbol class. Once the data strings to be scanned for potential sensitive information have been converted into fixed string patterns, the fixed string patterns can be compared with known patterns having secured data types. For instance, DLP agent 110 can be configured to detect potential leakage of an account number, a credit card number, a social security number, a date of birth, etc. In an exemplary implementation, as described in further detail below, any type of sensitive data that can be represented in the form of one or more regular expressions can be converted to one or more corresponding fixed patterns for more efficient detection by DLP agent 110. Those skilled in the art will appreciate that data having a fixed pattern (e.g., "012-01-0123" or "0123456789" or "012 01 0123") is computationally less expensive to match than a regular expression (e.g., a regular expression defining a social security number as "([^0-9-]|^([0-9]{3}-[0-9]{2}-[0-9]{4}(^0-9-]|$)").

In an exemplary implementation, DLP agent 110 can include a database and/or a list of stored target strings (e.g., sensitive fixed data DLP patterns of concern to the enterprise) that may be representative of sensitive data. After converting an input data string into a fixed string pattern, DLP agent 110 can compare the converted fixed string pattern with each stored target string of the list of stored target strings. In an exemplary implementation, any existing string matching algorithm can be used for comparing converted fixed string pattern with the stored target strings/patterns. In an exemplary implementation, if the converted fixed string pattern matches with the stored target pattern, DLP agent 110 can flag the transfer attempt. In an exemplary implementation, based on one or more policy rules, DLP agent 110 can take appropriate actions on the input string. Exemplary actions that can be taken on an input string upon detection of a transfer attempt, for example, containing sensitive data, include, but are not limited to, blocking/deleting the particular transaction/string, raising an alarm, sending information on the string/sender/sending computing device to an administrator, or restricting any further action by the user on his/her respective client device 102, or restricting any further user action on the protected network.

Figure 1B:
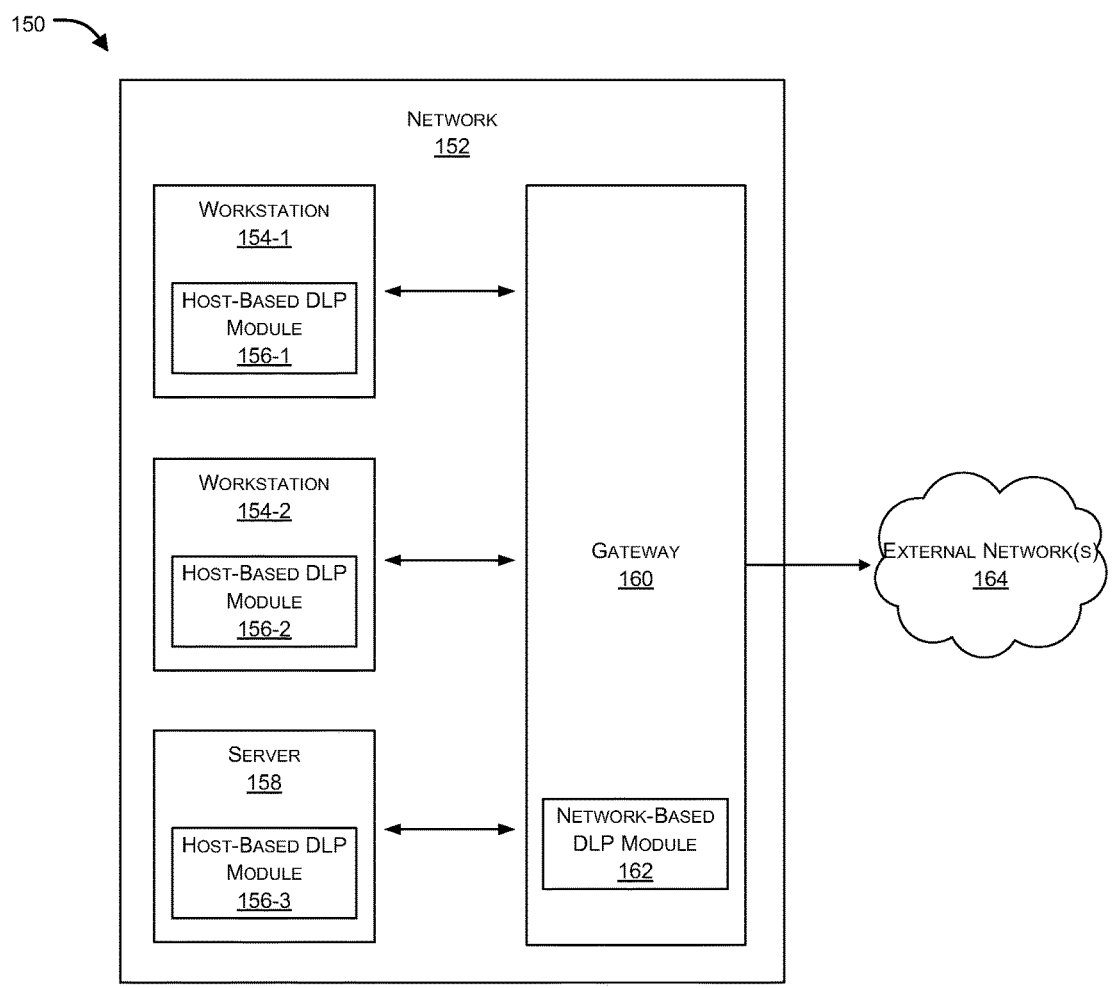
FIG. 1B illustrates another exemplary network architecture showing configuration of host and network based DLP modules in accordance with an embodiment of the present invention.

FIG. 1B illustrates another exemplary network architecture 150 showing configuration of host and network based DLP modules in accordance with an embodiment of the present invention. As shown in FIG. 1B, a network 152 can include several workstations such as workstation 154-1 and workstation 154-2, and a server 158, and can further include a gateway 160 that is configured to allow data communication with one or more external networks (e.g., external network(s) 164). In an exemplary embodiment, gateway 160 can include a network-based DLP module 162 that can be configured to detect and prevent data leakage from devices within network 152. In an exemplary implementation, network-based DLP module 162 can be implemented within a network security device (e.g., gateway 160, a firewall (not shown), an intrusion prevention system (IPS) (not shown) or other network security devices that are capable of monitoring data flow within or through network 152. In an exemplary implementation, network-based DLP module 162 can be configured to detect sensitive data contained within an electronic communication (e.g., a file transfer, an email message, an instant message or the like). In an exemplary implementation, network-based DLP module 162 can be configured to scan network traffic as it is attempted to be passed through gateway 160 in order to detect the presence of sensitive data. As described in further detail below, DLP module 162 can be configured to create a copy of data attempted to be passed through gateway 160 by converting data contained within the network traffic from its original form into a set of fixed string patterns. Then, the fixed string patterns can be efficiently compared with the stored target strings/patterns, which may representative of sensitive data to confirm the presence or absence of sensitive data in the network traffic at issue.

In an exemplary implementation, a host-based DLP module such as host-based DLP module 156-1, host-based DLP module 156-2, host-based DLP module 156-3, which may be collectively and interchangeably referred to as host-based DLP module(s) 156 hereinafter, can respectively be implemented within workstation 154-1, workstation 154-2 and server 158. In an exemplary implementation, each host-based DLP module 156 may have a different set of stored target strings depending on the kind of data that needs to be prevented from being leaked from the particular computing device. In an exemplary implementation, stored target strings can represent patterns of the sensitive data that can be configured manually by a user and/or an administrator of the computing device or network. In another exemplary implementation, stored target strings can be dynamically updated from a centralized location by an administrator of network 152.

In different applications, host-based DLP module 156 can be configured to detect leakage of sensitive data at an application or presentation level, while the network-based DLP module 162 can be configured to detect leakage of sensitive data at layer 2 or layer 3 of the OSI layers. In an exemplary implementation, DLP modules, such as host-based DLP module 156 and network-based DLP module 162 can be configured to have substantially the same or different functionality.

Figure 2:
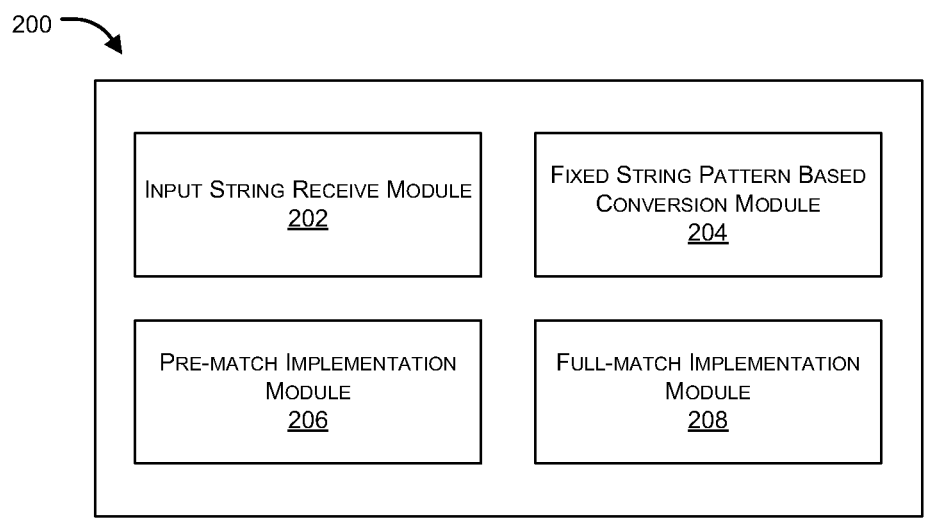
FIG. 2 illustrates exemplary functional modules of a fixed string pattern based matching system in accordance with an embodiment of the present invention.

FIG. 2 illustrates exemplary functional modules of fixed string pattern based matching system 200 in accordance with an embodiment of the present invention. As shown in FIG. 2, fixed string pattern based matching system 200 can include an input string receive module 202 that can be configured to receive an input string, a fixed string pattern based conversion module 204 that can be configured to convert the input string into a fixed string pattern, a pre-match implementation module 206 that can be configured to enable parallel matching of the fixed string pattern with one or more patterns of stored target strings, and a full-match implementation module 208 that can be configured to match the input string with one or more stored target strings when the fixed string pattern matches one of the patterns of the stored target strings.

In an example implementation, input string receive module 202 can include a parser and/or a syntax analyzer for splitting the communication traffic into one or more logical input strings. The input string receive module 202 can be configured to receive the input strings from a network interface and/or from an external device interface and/or from any other data transfer ports such as USB port, DVD writer, microSD port, among other devices, such as network devices, including, but not limited to firewalls or gateway devices. In an exemplary implementation, input string receive module 202 can be configured to receive communication data and parse the communication into different input strings for further analysis. In an exemplary implementation, different input strings can be further be processed in parallel by any or a combination of fixed string pattern based conversion module 204, pre-match implementation module 206, and full-match implementation module 208.

In an aspect, fixed string pattern based conversion module 204 can be configured to convert/translate the input strings into fixed string patterns based on different class definitions, which can include a character class definition such as digit class, letter class, and a symbol class. In an exemplary implementation, an input string can be converted into a corresponding fixed string pattern by identifying a matching class from the class definitions. In an exemplary implementation, an input string can be converted into a fixed string pattern by scanning a first character of the input string and representing that character with the initial value of the relevant class and then counting the number of subsequent characters in that class until a character of a different input class is encountered in the input string. The input string can therefore be represented by replacing its first character by its character class followed by an integer value that is indicative of number of times the same character class is repeated in the input string, after which the first character encountered that is associated a different character class is replaced by the its corresponding character class and so on. For instance, if an input string is 01-02-1986, the corresponding fixed string pattern can be D2-D2-D4, wherein the character class is digit (D), and on finding the match with the character class, the input string is represented by the representative symbol D and then the consecutive matches are counted until a non-digit character "-" is detected in the string. In an exemplary implementation, a special character can be presented with the appropriate symbol, or can be represented as mere substitution of the same character of input string in the converted fixed string pattern. For example, the character "-" can be represented as "-" or by any other defined symbol class representation in the character class definition.

In an exemplary implementation, fixed string pattern based conversion module 204 can be configured to form a fixed string pattern by scanning each character of the input string and identifying a matching class of multiple defined character classes for the character at the current character position within the input string, and replacing/representing the character at the current character position within the input string with a single character associated with the matching class followed by an integer value indicative of consecutive matches to the identified matching classes.

In an exemplary implementation, the character class definitions can include different character classes that may further include predefined character class functions, which can scan an input string and convert the string into a standard/defined format/pattern. In an exemplary implementation, the character class definition used by fixed string pattern based conversion module 204 can include, but is not limited to, a digit class (represented as D), a letter class (represented as C), and a symbol class (represented as S), wherein the digit class D can include a definition that converts an input string by identifying whether the character of the scanned position at the input string is a digit, and then counting the number of characters that are digits (0-9) unless the character at the scanned position is a character of different class. In an embodiment, letter class function/definition can include specific classes such as lower case letter sub-class (represented as L, for instance) for representing input string(s) that contain lower case characters [a-z], and upper case letter sub-class (represented as U, for instance) for representing input string(s) that contain upper case characters [A-Z]. In another embodiment, symbol class function/definition can include sub-classes such as support symbols sub-class and an unsupported sub-class. For example, an example input string "89456" can be represented as D5 using the digit class definition. Similarly, the input string "NAME" can be represented as C4 using the letter class definition/function. In another exemplary implementation, an input string containing special characters can be represented in similar manner using the symbol class function. For instance, "SSN: 888-99-2015" can be converted into "U3: D3-D2-D4", "Birthday: Dec. 18, 1988" can be converted into "UL7: D2/D2/D4", "Tel: (408)888-9999" can be converted into "UL2: (D3)D3-D4", "California vehicle registration plates: 6SAM888" can be converted into "UL9 L7 K12 L6: DU3D3", "American Express: 4444-666666-55555" can be converted into "UL7: D4-D6-D5", and "International Bank Account Number: GB29 NWBK 6016 1331 9268 19" can be converted into "UL11 UL3 UL6 UL5: U2D2 U4 D4 D4 D2".

In an aspect, symbol class can include other defines characters/representation such as for instance, {all other chars}, including white spaces, special characters, which can be 194 in total in an embodiment.

In an aspect, fixed string pattern based conversion module 204 can be configured to detect any of integer overflows or long word overflows while converting the input string to the fixed string pattern.

In another exemplary implementation, fixed string pattern based conversion module 204 can be configured to form a fixed string by scanning each character of the input string, identifying a matching class of the defined classes for a character at the character position within the input string, replacing the character at the character position within the input string with a current replacement character of multiple replacement characters associated with the matching class, and setting the current replacement character to the next character in sequence of the plurality of representative character of character class. For instance, a conversion function on D can be defined based on its consecutive count within the D class. The first digit can be converted to 0 (the first element in D), the second consecutive digit within the input string can be converted to 1. Furthermore, the conversion can be defined cyclically if more than 10 consecutive digits occur in an input string, for instance, the 25th consecutive digit can be converted to 4. Similarly, a conversion function on U (or L), the first upper (or lower) case letter can be defined in order to convert them to first letter 'A' (or 'a'), and so on. In another embodiment, no conversions can be performed on symbol class function S, that is, each character in class S is unchanged. Those skilled in the art will appreciate that this is only an exemplary illustration and one implementation for how the conversion can be performed. Other character class definitions are completely within the scope of the present disclosure. Following the above-mentioned definition, an input stream "SSN: 888-99-2015" can be converted into "ABC: 012-01-0123", "Birthday: Dec. 18, 1988" can be converted into "Aabcdefg: 01/01/0123", "Tel: (408)888-9999" can be converted into "Aab: (012)012-0123", "California vehicle registration plates: 6SAM888" can be converted into "Aabcdefghi abcdefg abcdefghijkl abcdef: 0ABC012", "American Express: 4444-666666-55555" can be converted into "Aabcdefg Aabcdef: 0123-012345-01234", and "International Bank Account Number: GB29 NWBK 6016 1331 9268 19" can be converted into "Aabcdefghijk Aabc Aabcdef Aabcde: AB01 ABCD 0123 0123 0123 01".

In an aspect, after conversion of the input string into a corresponding fixed pattern string, the fixed pattern string can be matched with one or more target string patterns to identify the presence of sensitive data within the communication that the input string forms part of. Pre-match implementation module 206 can be configured to match the fixed pattern string with one or more stored target string patterns. Those of ordinary skill in the art will appreciate that the pre-match implementation module 206 can have a list and/or a database of stored string patterns that can be representative of sensitive data and such a list/database/repository may have been generated based on similar character class functions/definitions. In an exemplary implementation, pre-match implementation module 206 can be configured to match a fixed pattern string with one or more stored target string patterns in parallel or in sequence. It is also possible to run multiple instances of the pre-match implementation module 206 to match different fixed pattern strings with the one or more of stored target string patterns in parallel.

In an aspect, a match of a fixed string pattern with at least one stored target string pattern by the pre-match implementation module 206 can be indicative of a potential sensitive data leak. In an exemplary implementation, pre-match implementation module 206 can be configured to incorporate an appropriate action based on one or more predefined policy rules. In another exemplary implementation, pre-match implementation module 206 can be configured to initiate a full-match implementation module 208 that can be configured to match the input string with the stored target string. In another implementation, pre-match implementation module 206 can be configured to take an appropriate action such as blocking the communication that contains the input string for which the fixed string pattern matches with at least one stored target string pattern. Similarly, pre-match implementation module 206 can take another appropriate action such as reporting of the detected leak to an administrator or to an actual owner of the sensitive data. In another exemplary implementation, one or more actions can be taken by the pre-match implementation module 206 based on one or more predefined or dynamically changing DLP policies or rules.

In an exemplary implementation that involves representation of a string by a character followed by the number of times the character class is repeated, as illustrated above, a SSN can be matched with one or more of "D3-D2-D4", "D9" and "D3 D2 D4"; DOB can be matched with one or more of "D2/D2/D4" and "D2-D2-D4"; Tel. No. can be matched with one or more of "(D3)D3-D4", "D3-D3-D4" and "D3.D3.D4"; California VR Plate can be matched with "DU3D3", American Express card can be matched with one or more of "D4-D6-D5", "D15" and "D4 D6 D5" and IBAN can be matched with "U2D2 U4 D4 D4 D4 D2".

In an exemplary implementation that involves representation of a string by a character followed by the number of times the character class is repeated and representation of symbols with S followed by the number of times the symbol class is repeated, as illustrated above, a SSN can be matched with one or more of "D2SD3SD4", "D9" and "D2 D3 D4"; DOB can be matched with "D2SD2SD4"; Tel. No. can be matched with one or more of "SD3 SD3 SD4" and "D3 SD3 SD4".

In another exemplary implementation that involves representation of a first character followed by sequentially increasing numbers, above-illustrated SSN can be matched with following stored pattern "012-01-0123" to confirm if a SSN number is being communicated. Similarly, DOB can be matched with one or more of "01/01/0123" and "01-01-0123"; Tel. No. can be matched with one or more of "(012)012-0123", "012-012-0123" and "012.012.0123"; California VRP can be matched with "0ABC012", American Express card can be matched with "0123-012345-01234", and IBAN can be matched with "AB01 ABCD 0123 0123 0123 01". In an aspect, such a conversion can be applied to DLP patterns that support most digit related numbers or formats. It is also possible to pre-match DLP patterns simultaneously. In another aspect/embodiment of the present disclosure, cycle (period) can be set smaller (say 8 instead of 10 or 26) to simplify hardware logic or to reduce hardware cost. That is, instead of running from, for letter class, A-Z, the run can be from A-H to then come back to A, and similarly, for digit class, instead of running from 0-9, the run can be from 0-7 and then back to 0. In an exemplary implementation, an IP address can also be pre-matched by "(0|1|2)\.0(|1|12)\.0(|1|12)\.0" (27 alternation patterns), wherein 32-bit integer overflow can be pre-matched with "01234567890" or shorter string "7890".

In an aspect, for efficient and fast matching of an input string pattern with stored target string patterns, pre-match implementation module 206 can use one or combination of deterministic finite automaton algorithm, Morris-Pratt algorithm, Brute Force algorithm, Karp-Rabin algorithm, Shift Or algorithm, Knuth-Morris-Pratt algorithm, Simon algorithm, Colussi algorithm, Galil-Giancarlo algorithm, Apostolico-Crochemore algorithm, Not So Naive algorithm, Boyer-Moore algorithm, Turbo BM algorithm, Apostolico-Giancarlo algorithm, Reverse Colussi algorithm, Horspool algorithm, Quick Search algorithm, Tuned Boyer-Moore algorithm, Zhu-Takaoka algorithm, Berry-Ravindran algorithm, Smith algorithm, Raita algorithm, Reverse Factor algorithm, Turbo Reverse Factor algorithm, Forward Dawg Matching algorithm, Backward Nondeterministic Dawg Matching algorithm, Backward Oracle Matching algorithm, Galil-Seiferas algorithm, Two Way algorithm, String Matching on Ordered Alphabets algorithm, Optimal Mismatch algorithm, Maximal Shift algorithm, Skip Search algorithm, KMP Skip Search algorithm, and Alpha Skip Search algorithm.

In an aspect, one exemplary DLP policy may require a full match of input string with the stored target string(s) in order to confirm presence of sensitive data before taking any further action. For example, a policy rule may require protection of sensitive data where the PAN (personal account number) is needed to be matched with specific PAN of a particular user. In an exemplary implementation, pre-match implementation module 206 can be configured to enable simultaneous matching between the fixed string pattern and one or more stored target strings that are representative of sensitive data in order to determine whether the input string contains potential sensitive data to which a full-match is to be applied using the full-match implementation module 208.

In an aspect, full-match implementation module 208 can be configured to match an input string with stored target string(s), and not only the pattern of input string with the pattern of stored target string, but instead conducting a full match. Full-match implementation module 208 can be used to confirm presence of a specific/particular string, wherein the pre-match implementation module 206 can match the pattern of the input string with the pattern of target strings to identify potential indication of presence of sensitive data. In an exemplary implementation, full-match implementation module 208 can also be configured to perform one or more matches of one or more input string with one or more stored target strings.

For efficient and fast matching of input string with stored target strings, full-match implementation module 208 can use one or combination of deterministic finite automaton algorithm, Morris-Pratt algorithm, Brute Force algorithm, Karp-Rabin algorithm, Shift Or algorithm, Knuth-Morris-Pratt algorithm, Simon algorithm, Colussi algorithm, Galil-Giancarlo algorithm, Apostolico-Crochemore algorithm, Not So Naive algorithm, Boyer-Moore algorithm, Turbo BM algorithm, Apostolico-Giancarlo algorithm, Reverse Colussi algorithm, Horspool algorithm, Quick Search algorithm, Tuned Boyer-Moore algorithm, Zhu-Takaoka algorithm, Berry-Ravindran algorithm, Smith algorithm, Raita algorithm, Reverse Factor algorithm, Turbo Reverse Factor algorithm, Forward Dawg Matching algorithm, Backward Nondeterministic Dawg Matching algorithm, Backward Oracle Matching algorithm, Galil-Seiferas algorithm, Two Way algorithm, String Matching on Ordered Alphabets algorithm, Optimal Mismatch algorithm, Maximal Shift algorithm, Skip Search algorithm, KMP Skip Search algorithm, and Alpha Skip Search algorithm.

In an aspect, due to the proposed conversation of an input string into a fixed pattern string, converted data can be compressed in a natural way, wherein pre-match patterns are easier for understanding and writing, and have lower false-alarms as they contain more ending information. In an aspect, as mentioned above, symbol class can be divided into two sub-classes, one called supported symbols S, and the other called unsupported Symbols X, wherein conversions on unsupported symbols can be done with consecutive count output similar to classes D, U or L. For instance, S={all non-alphanumeric symbols between 0x00-0x127}, and X={all symbols between 0x80-0xff}, wherein a stream "\x80\x81\x82\x83x84_\x85\x86\x88 test 12345" can be converted to: "X4 X_X3 L4 D5".

In an aspect, a standard Deterministic Finite Automata (DFA) algorithm can be applied on the streams after the above conversions, as a result of which the DFA memory size can significantly be reduced. It is also possible to incorporate/utilize bloom filters and hash tables for detecting and/or filtering DLP patterns in parallel. In yet another aspect, Integer overflows and/or long word overflows can be detected using this implementation also. In yet another aspect, U and L can be merged into one class W if case-sensitivity does not impact the string conversion/matching.

Figure 3:
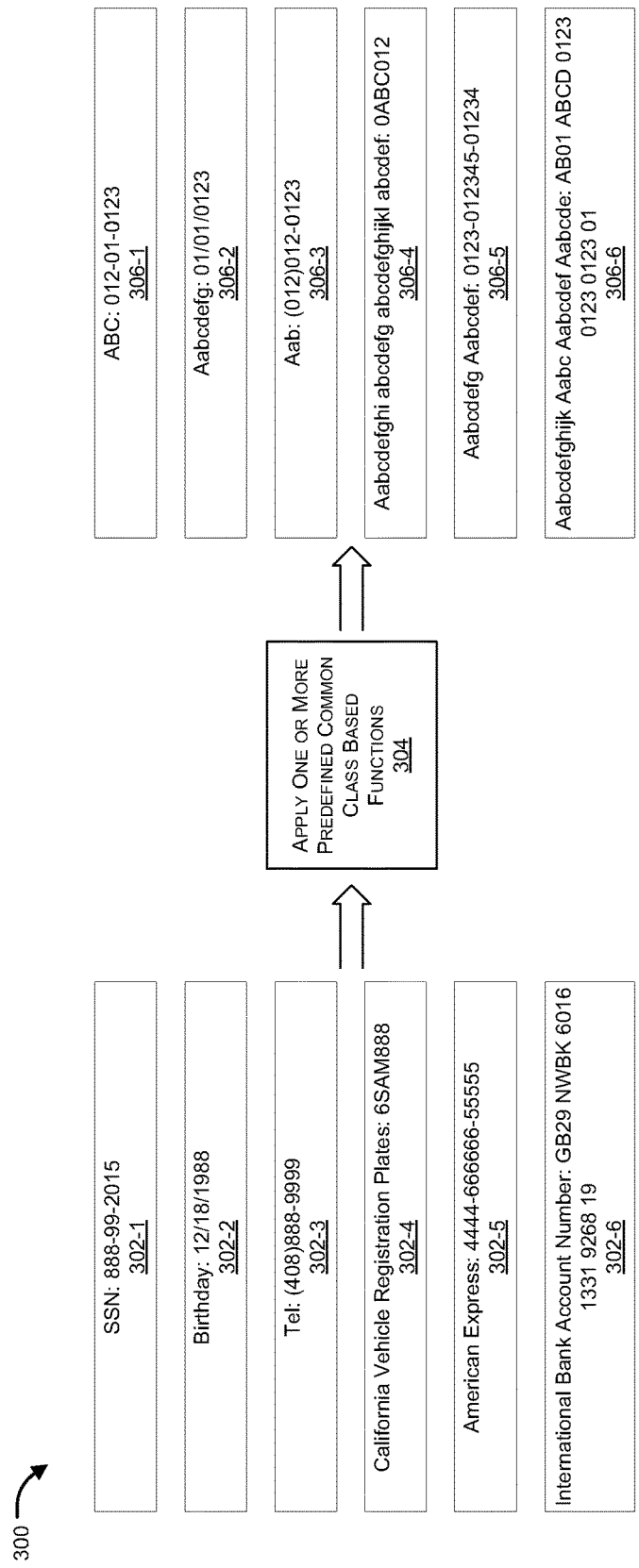
FIG. 3 illustrates an example showing conversion of an input string to a fixed string pattern in accordance with an embodiment of the present invention.

FIG. 3 illustrates an example 300 showing conversion of an input string 302 to a fixed string pattern 306 in accordance with an embodiment of the present invention. As shown in FIG. 3 and also illustrated above, an input string such as 302-1 SSN: 888-99-2015 can be processed with respect to one or more predefined common class based functions 304 to be converted into corresponding fixed pattern string ABC: 012-01-0123, and similarly other strings 302-2 to 302-6, for instance, can be converted into corresponding fixed pattern strings, which can then be matched with corresponding stored/pre-defined target pattern strings such as SSN string can be matched with a pattern "012-01-0123" to confirm if the input string includes an SSN identifier.

Figure 4:
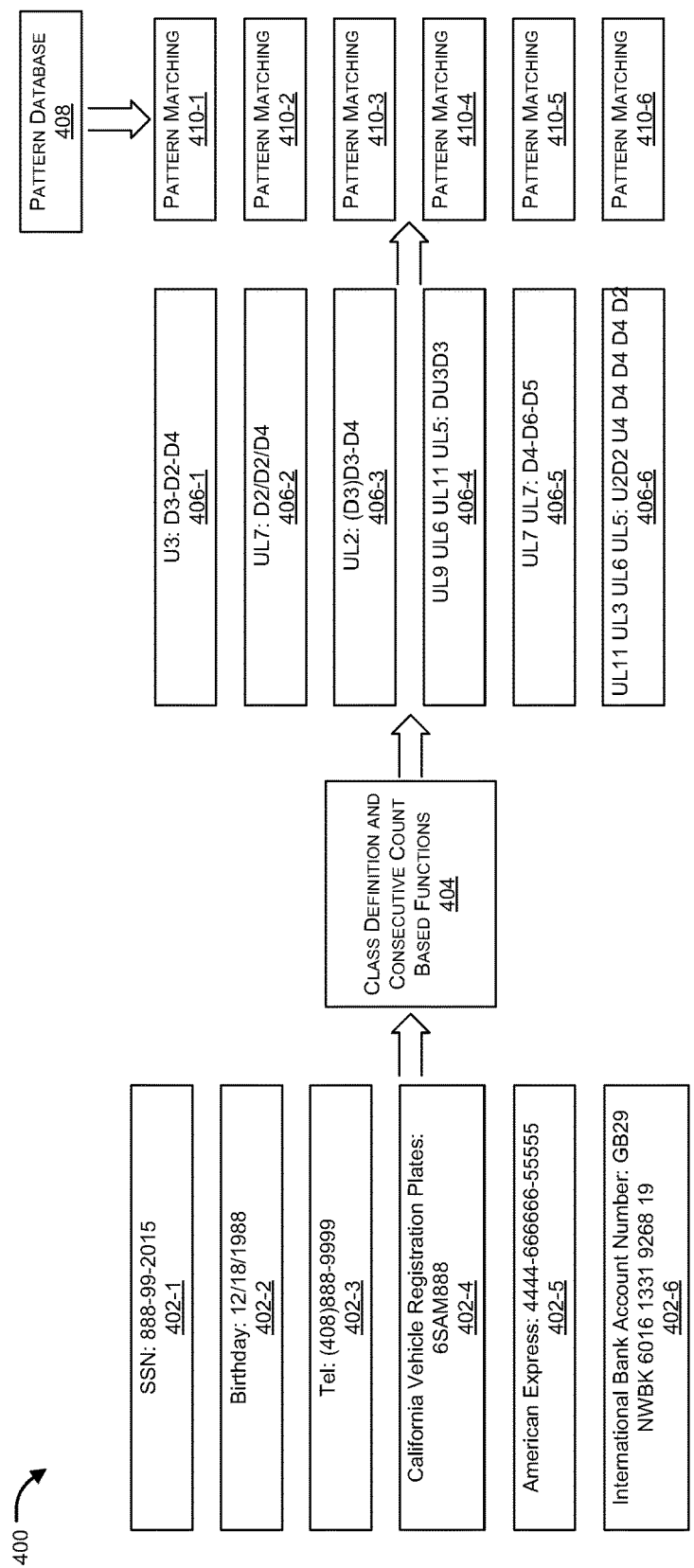
FIG. 4 illustrates another example showing conversion of an input string to a fixed string pattern in accordance with an embodiment of the present invention.

FIG. 4 illustrates another example 400 showing conversion of an input string 402 to a fixed string pattern 406 in accordance with an embodiment of the present invention. As shown in FIG. 4 and also illustrated above, input string such as 402-1 SSN: 888-99-2015 can be processed with respect to one or more class definition and consecutive count based functions 404 to be converted into corresponding fixed pattern string U3:D3-D2-D4, and similarly other strings 402-2 to 402-6, for instance, can be converted into corresponding fixed pattern strings, which can then be matched at 410 with corresponding stored/pre-defined target pattern strings (stored, for instance, in a pattern database 408) such as SSN string can be matched with a pattern "U3:D3-D2-D4" to confirm if the input string include an SSN identifier.

Figure 5:
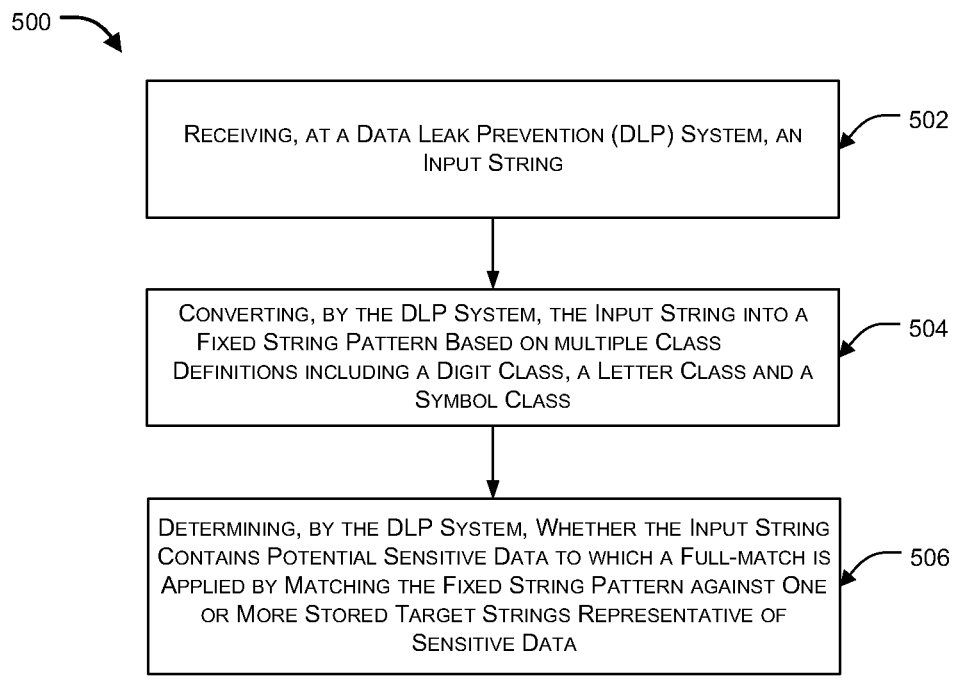
FIG. 5 is a flow diagram illustrating a DLP process in accordance with an embodiment of the present invention.

FIG. 5 is a flow diagram 500 illustrating a DLP process in accordance with an embodiment of the present invention. At step 502, the method can include receiving, at a data leak prevention (DLP) system, an input string, and at step 504, the method can include the step of converting, by the DLP system, the input string into a fixed string pattern based on a plurality of class definitions including a digit class, a letter class and a symbol class. At step 506, the method can further include the step of determining, by the DLP system, whether the input string includes potential sensitive data to which a full-match can be applied by matching the fixed string pattern against one or more stored target strings that are representative of sensitive data.

Figure 6A:
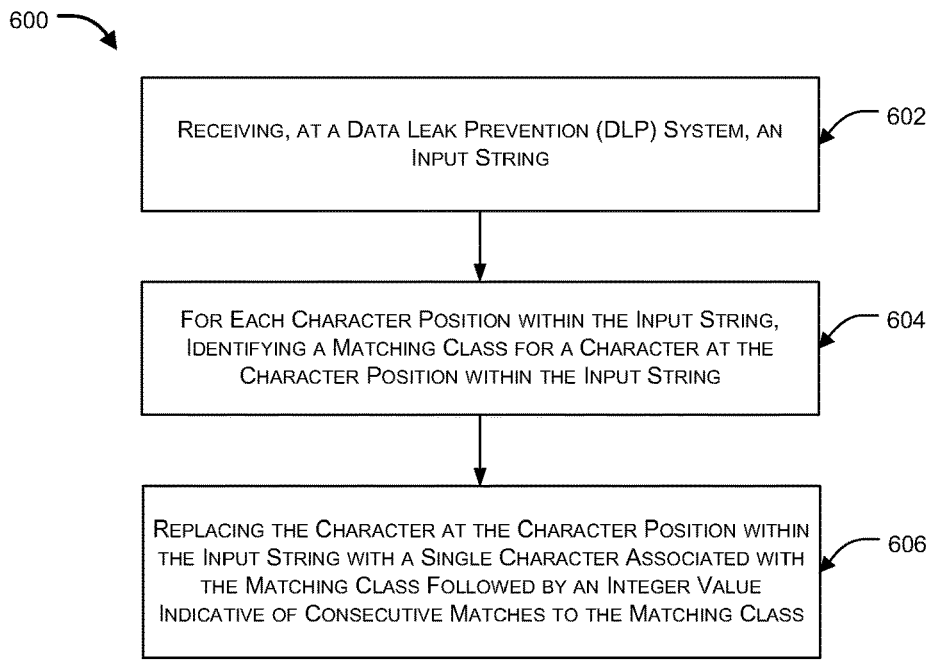
FIGS. 6A and 6B are flow diagrams illustrating a DLP process for generation of a fixed pattern string from an input string in accordance with an embodiment of the present invention.
Figure 6B:
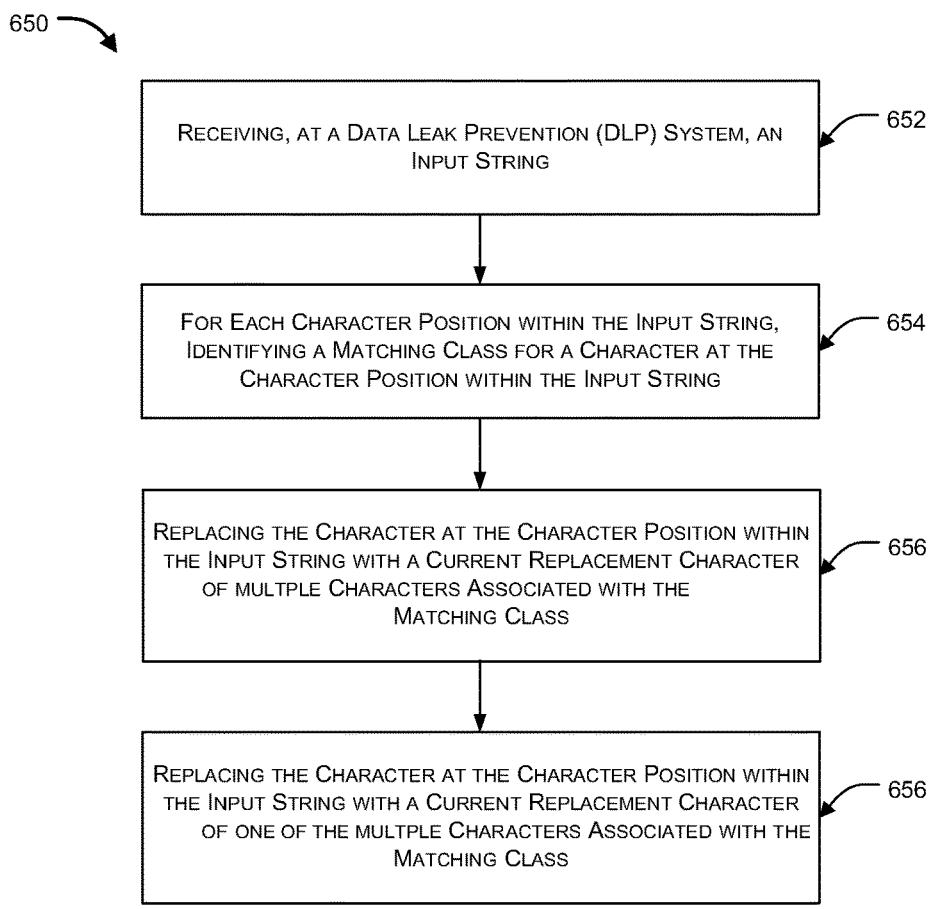

FIGS. 6A and 6B are flow diagrams 600 and 650 illustrating a DLP process for generation of a fixed pattern string from an input string in accordance with an embodiment of the present invention. At step 602, the method can include receiving, at a data leak prevention (DLP) system, an input string, and at step 604, the method can include, for each character position within the input string, identifying a matching class for a character at the character position within the input string. The method can further include, at step 606, replacing the character at the character position within the input string with a single character associated with the matching class followed by an integer value indicative of consecutive matches to the matching class. With respect to FIG. 6B, at step 602, the method can include receiving, at a data leak prevention (DLP) system, an input string, and at step 654, for each character position within the input string, identifying a matching class for a character at the character position within the input string. At step 656, the method can include the step of replacing the character at the character position within the input string with a current replacement character of a plurality of characters associated with the matching class, and at step 658, setting the current replacement character to a next character of the plurality of characters.

Figure 7:
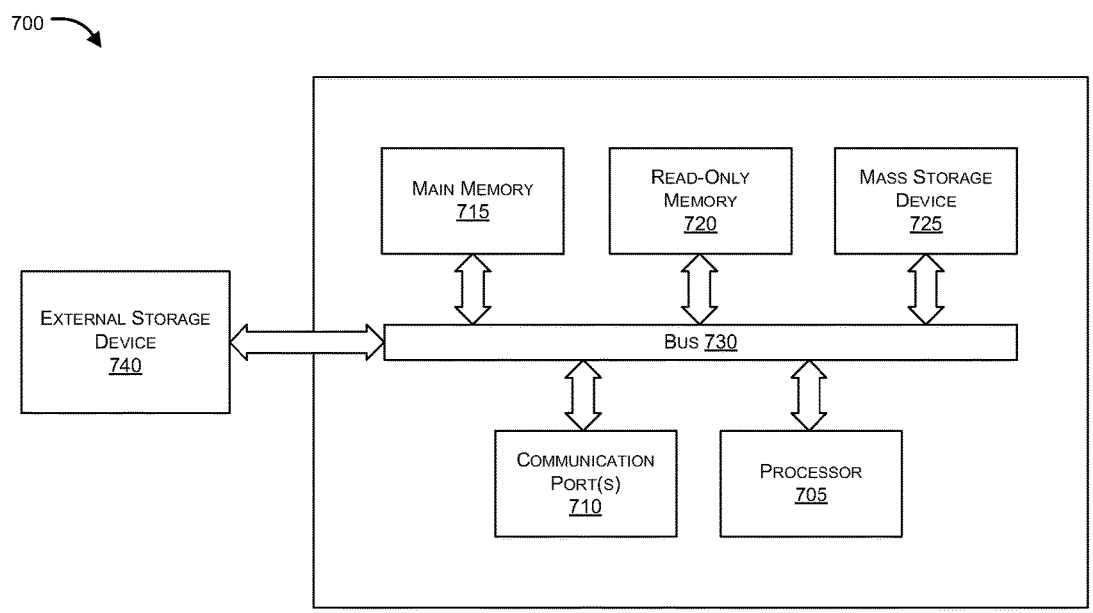
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network security device (e.g., a gateway, a firewall or an IPS), a network appliance, a server, a client workstation or other device implementing DLP.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of preventing data leakage comprising:
avoiding inefficiencies of regular expression pattern matching by maintaining, by a Data Leak Prevention (DLP) module running on a computer system, a plurality of target strings, wherein each of the plurality of target strings represent a generalized form of a type of potential sensitive data to be detected, including a plurality of defined-length groupings of characters from one or more of a plurality of class definitions potentially separated by whitespace or one or more symbols, wherein the plurality of class definitions include a digit class, representing numbers '0' through '9', and a letter class, representing all or a subset of letters 'a' through 'z' and 'A' through 'Z';
receiving, by the DLP module, an input string that is to be checked for existence of potential sensitive data;
facilitating matching of the input string against multiple of the plurality of target strings in parallel by converting, by the DLP module, the input string into a fixed string pattern including (i) information indicative of a plurality of groups of consecutive sequences of characters within the input string that are associated with a common class definition of the plurality of class definitions, (ii) a count representing a number of characters within each of the plurality of groups and (iii) optional separators in a form of whitespace or one or more symbols;
determining, by the DLP module, whether the input string contains the potential sensitive data to which a full-match is to be applied by matching the fixed string pattern against one or more of the plurality of target strings; and
when the full-match results in an affirmative determination that the input string contains the potential sensitive data, then preventing, by the DLP module, dissemination of the potential sensitive data.

2. The method of claim 1, wherein said converting, by the DLP module, the input string into a fixed string pattern comprises:
sequentially processing each character within the input string, including:
when multiple consecutive characters are identified that are associated with a class definition of the plurality of class definitions, replacing the multiple consecutive characters with a single character representing the class definition followed by an integer value representing a number of the multiple consecutive characters;
when an isolated character is identified that is associated with the class definition and the isolated character is not part of a group of multiple consecutive characters associated with the class definition, replacing the isolated character with the single character; and
when the character represents whitespace or a symbol, skipping the character or replacing the character with a corresponding predefined symbol.

3. The method of claim 2, wherein the type of potential sensitive data to be detected comprises a social security number and wherein the generalized form comprises "D3-D2-D4" or "D3 D2 D4", where 'D' is the single character representing the digit class.

4. The method of claim 2, wherein the type of potential sensitive data to be detected comprises a telephone number and wherein the generalized form comprises "(D3)D3-D4", "D3.D3.D4" or "D3-D3-D4", where 'D' is the single character representing the digit class.

5. The method of claim 2, wherein the type of potential sensitive data to be detected comprises a date of birth and wherein the generalized form comprises "D2/D2/D4" or "D2-D2-D4", where 'D' is the single character representing the digit class.

6. The method of claim 2, wherein the type of potential sensitive data to be detected comprises a credit card number or a bank account number and wherein the generalized form comprises "D4-D6-D5", "D4 D6 D5", D4-D4-D4-D4", "D4 D4 D4 D4", where 'D' is the single character representing the digit class.

7. A non-transitory computer-readable storage medium embodying a set of instructions, which when executed by one or more processors of a computer system, cause the one or more processors to perform a method of preventing data leakage, the method comprising:
avoiding inefficiencies of regular expression pattern matching by maintaining a plurality of target strings, wherein each of the plurality of target strings represent a generalized form of a type of potential sensitive data to be detected, including a plurality of defined-length groupings of characters from one or more of a plurality of class definitions potentially separated by whitespace or one or more symbols, wherein the plurality of class definitions include a digit class, representing numbers '0' through '9', and a letter class, representing all or a subset of letters 'a' through 'z' and 'A' through 'Z';
receiving an input string that is to be checked for existence of potential sensitive data;
facilitating matching of the input string against multiple of the plurality of target strings in parallel by converting the input string into a fixed string pattern including (i) information indicative of a plurality of groups of consecutive sequences of characters within the input string that are associated with a common class definition of the plurality of class definitions, (ii) a count representing a number of characters within each of the plurality of groups and (iii) optional separators in a form of whitespace or one or more symbols;
determining whether the input string contains the potential sensitive data to which a full-match is to be applied by matching the fixed string pattern against one or more of the plurality of target strings; and
when the full-match results in an affirmative determination that the input string contains the potential sensitive data, then preventing dissemination of the potential sensitive data.

8. The non-transitory computer-readable storage medium of claim 7, wherein said converting the input string into a fixed string pattern comprises:
sequentially processing each character within the input string, including:
when multiple consecutive characters are identified that are associated with a class definition of the plurality of class definitions, replacing the multiple consecutive characters with a single character representing the class definition followed by an integer value representing a number of the multiple consecutive characters;
when an isolated character is identified that is associated with the class definition and the isolated character is not part of a group of multiple consecutive characters associated with the class definition, replacing the isolated character with the single character; and
when the character represents whitespace or a symbol, skipping the character or replacing the character with a corresponding predefined symbol.

9. The non-transitory computer-readable storage medium of claim 8, wherein the type of potential sensitive data to be detected comprises a social security number and wherein the generalized form comprises "D3-D2-D4" or "D3 D2 D4", where 'D' is the single character representing the digit class.

10. The non-transitory computer-readable storage medium of claim 8, wherein the type of potential sensitive data to be detected comprises a telephone number and wherein the generalized form comprises "(D3)D3-D4", "D3.D3.D4" or "D3-D3-D4", where 'D' is the single character representing the digit class.

11. The non-transitory computer-readable storage medium of claim 8, wherein the type of potential sensitive data to be detected comprises a date of birth and wherein the generalized form comprises "D2/D2/D4" or "D2-D2-D4", where 'D' is the single character representing the digit class.

12. The non-transitory computer-readable storage medium of claim 8, wherein the type of potential sensitive data to be detected comprises a credit card number or a bank account number and wherein the generalized form comprises "D4-D6-D5", "D4 D6 D5", D4-D4-D4-D4", "D4 D4 D4 D4", where 'D' is the single character representing the digit class.

13. The non-transitory computer-readable storage medium of claim 7, wherein the set of instructions are part of a host-based DLP module and wherein the computer system comprises a client computing system.

14. The non-transitory computer-readable storage medium of claim 7, wherein the set of instructions are part of a network-based DLP module and wherein the computer system comprises a network security device.

* * * * *